United States Patent [19]
Raffel et al.

[11] Patent Number: 5,440,144
[45] Date of Patent: Aug. 8, 1995

[54] APPARATUS FOR THE THREE-DIMENSIONAL DETERMINATION OF FLOWS

[75] Inventors: Markus Raffel, Göttingen; Jürgen Kompenhans, Gleichen; Hans Höfer, Göttingen, all of Germany

[73] Assignee: Deutsche Forschungsanstalt Fur Luft-Und Raumfahrt E.V., Cologne, Germany

[21] Appl. No.: 142,607

[22] Filed: Oct. 25, 1993

[30] Foreign Application Priority Data

Nov. 6, 1992 [DE] Germany .................... 42 37 440.5

[51] Int. Cl.$^6$ ............................................. G01N 15/06
[52] U.S. Cl. ..................................... 250/574; 356/28
[58] Field of Search ................ 250/558, 574; 356/12, 356/13, 14, 28, 337, 342, 343

[56] References Cited
U.S. PATENT DOCUMENTS

| | | | |
|---|---|---|---|
| 3,723,004 | 3/1973 | Brayton | 356/28 |
| 4,227,079 | 10/1980 | Dukes et al. | 250/231 SE |
| 4,925,296 | 5/1990 | Reichmuth | 356/28 |
| 5,054,913 | 10/1991 | Ishikawa et al. | 356/28.5 |
| 5,148,229 | 9/1992 | Wiseall | 356/28 |
| 5,153,665 | 10/1992 | Weinstein | 356/28 |

OTHER PUBLICATIONS

Ronald J. Adrian, "Image Shifting Technique to Resolve Directional Ambiguity in Double-Pulsed Velocimetry", *Applied Optics*, 1 Nov. 1986, vol. 25, No. 21, pp. 3855–3858.

*Primary Examiner*—David C. Nelms
*Assistant Examiner*—Steven L. Nichols
*Attorney, Agent, or Firm*—Hopkins & Thomas

[57] ABSTRACT

An apparatus for the three-dimensional determination of flows has a light source for briefly illuminating a light section (3) and a stereoscopic recording device (10). The stereoscopic recording device (10) comprises two equivalent objectives (11, 12) aligned parallel to each other as well as perpendicular to the plane (22) of the light section (3), and behind the objectives (11, 12) two optical sensor fields (15, 16) aligned parallel to the plane (22). A forward displacement device for the synchronized forward displacement of the projections of the light source (3) onto the two sensor fields (15, 16) has two revolving mirrors (13, 14) aligned parallel and rotating in synchronization about a common axis of rotation (23) as well as in synchronization with the light source, whereby the axis of rotation (23) runs parallel to an imaginary line joining the two objectives (11, 12).

9 Claims, 3 Drawing Sheets

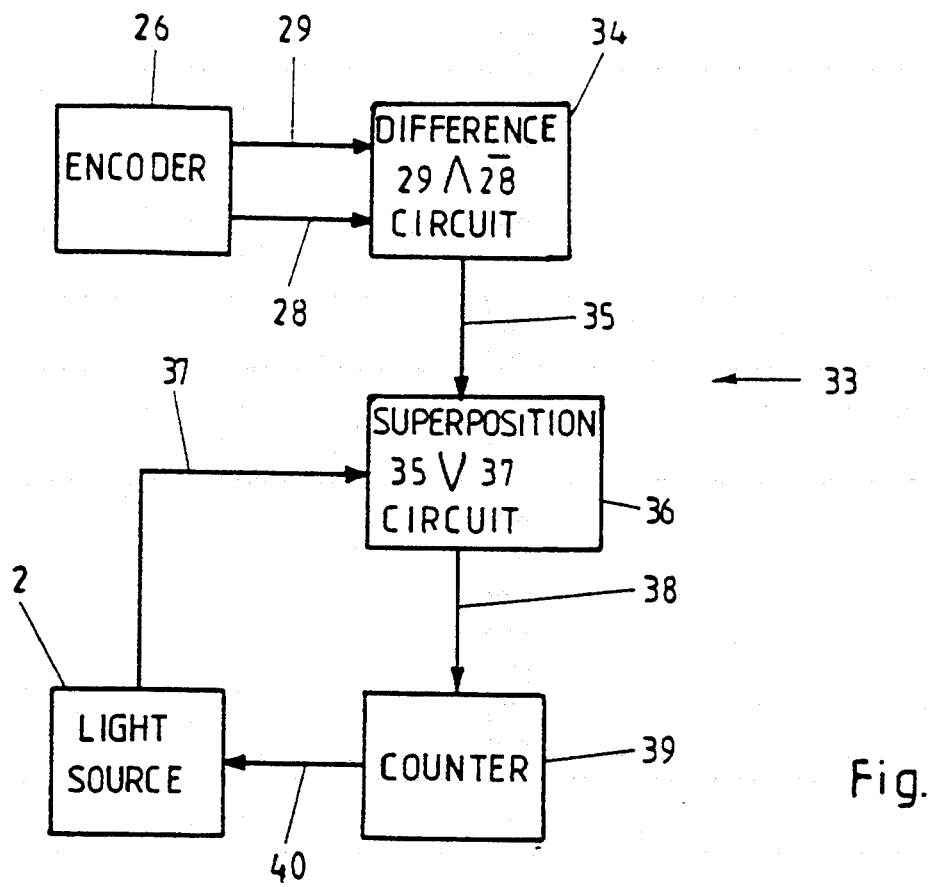
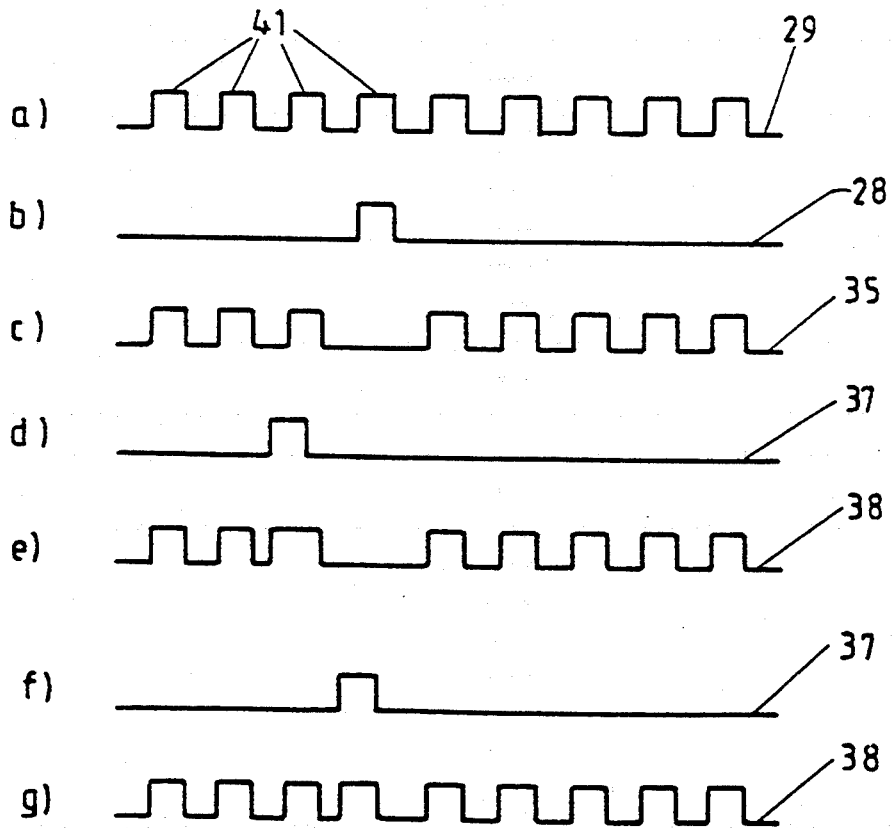
Fig. 3
Fig. 4

APPARATUS FOR THE THREE-DIMENSIONAL DETERMINATION OF FLOWS

BACKGROUND OF THE INVENTION

The invention refers to an apparatus for the three-dimensional determination of flows using a light source for briefly forming a sheet of light or light section and having a stereoscopic recording device which has two equivalent objectives with optical axes aligned parallel to each other as well as perpendicular to the plane of the light section, and located to receive light from the objectives, two optical sensor fields aligned perpendicular to the plane. The apparatus also includes a forward displacement or image shifting device for the synchronized forward displacement of the projections of the light source onto the two sensor fields. In this context the terms parallel and perpendicular are always to be understood as being relative to the optical axes. This means that with an arrangement of intermediate refractive boundary surfaces, a non-parallel or non-perpendicular geometrical arrangement can certainly occur.

The measuring principle behind the aforementioned apparatus is known as the pulsed light method or Particle Image Velocimetry (PIV). In this, the flow to be investigated is first doted with light-scattering particles. In some cases the flow's natural loading of various non-specific particles is sufficient. Then, at the point to be investigated in the flow, a flat space, a so-called light section light sheet, is created twice using the light source. By doing this, optical sensor fields are simultaneously exposed twice and an images of the light section are formed on the optical sensor fields. An objective with an optical axis aligned perpendicular to the plane of the light section is provided for the image, so that the plane of the light section falls in the object plane of said objective and the sensor field is arranged in the focal plane of said objective. The sensor field, exposed twice, now permits the determination of the velocity of the particles carried along by the flow in the plane of the light section. The velocity is always calculated from the separation between two images of a particle on the sensor field and the temporal separation of the two light pulses emitted by the light source, taking into account the imaging characteristics of the objective.

To evaluate the double exposure images of the light section, a two-fold Fourier transform is performed digitally as a fast Fourier transform and/or advantageously quickly as an optical Fourier transform for particular areas of the sensor field, respectively. Here, however, the mathematical sign of the flow velocity of the particles observed is lost in the light section. This is also true for all other cases in which, when the light section is imaged on the sensor field, it cannot be distinguished whether an individual image of a certain particle now in fact belongs to the first or the second illumination by the light source. A further disadvantage of the twin-flash method in its simplest form described here is that the velocities in the three-dimensional flow can only be recorded two-dimensionally, limited to the plane of the light section. To overcome these disadvantages, two modifications of the twin-flash method are known, and these may also be combined.

In order to record the direction of the velocities of the particles transported by the flow, the second image of the light section is forwardly displaced artificially on the sensor field by a certain dimension which at least corresponds to the maximum displacement of the particle opposite to the flow or opposite to the direction of the forward displacement respectively between the two illuminations of the light section. This means that all particle displacements which can be registered on the sensor field have the same mathematical sign and the actual direction of the flow can be determined without any trouble taking into account the size and direction of the forward displacement. Forward displaced twin-flash recordings of the light section can also be particularly easily evaluated by means of two-fold Fourier transform.

In order to make it possible to record in a three-dimensional manner the velocities in the three-dimensional flow, the light section is imaged simultaneously on two separate sensor fields using a stereoscopic arrangement. Of course, for this two separate objectives must be provided. A special feature of the stereoscopic arrangement results from the fact that the plane of the light section must coincide with the planes of both objectives so that two-dimensional, sharp images of the light section are at all possible on the two sensor fields. Accordingly, the objectives have optical axes that are arranged perpendicular to the plane of the light section and parallel to each other, so that the area of the light section located between the optical axes of the objectives is imaged stereoscopically on the sensors fields arranged outside the optical axes and aligned perpendicular to the plane of the light section. Therefore, although the particles transported by the flow are only illuminated in a comparatively flat space, a determination of the flow in all three dimensions is possible. For this, the two twin-flash recordings of the light section on the two sensor fields are evaluated parallel to each other and under mutual consideration. It is obvious that there is a limit to the three-dimensional resolution if the particles transported by the flow leave the flat, narrow space of the light section laterally between the two illuminations of the light section. This always happens if the velocity of the particles perpendicular to the plane of the light section is greater than the quotient arising from the thickness of the light section and the temporal separation of the two flashes of light emitted by the light source for illuminating the light section. However, with simultaneous forward displacement of the second image of the particles, the temporal separation of the flashes of light can be made much shorter without falling below the minimum separation between the two images which must be maintained for the evaluation. Therefore, the number of particles leaving the light section between the two flashes of light is reduced and, at the same time, the signal-to-noise ratio upon evaluation is improved by two-fold Fourier transform.

An apparatus of the aforementioned type, which is suitable for performing a stereoscopic twin-flash method with forward displacement, is known from the article "Stereoscopic Particle Image Velocimetry Applied to Liquid Flows" (Prassad, A. K.; Adrian, R. J., 6th International Symposium on Applications of Laser Technique to Fluid Mechanics, Lisbon, Portugal, 20 to 30 Jul. 1992, paper 6-1). This apparatus serves for determining a flow in a fluid, whereby the objectives and the sensor fields are arranged outside the fluid. Accordingly, the light scattered by the particles in the flow is refracted at the boundary surface of the fluid. This is compensated for by angling the sensor fields relative to a plane parallel to the plane of the light section. On the other hand, the optical axes of the two objectives are aligned both optically and geometrically perpendicular to the plane of the light section and parallel to each other. The forward displacement device in the known apparatus only displaces the sensor fields. This is costly, particularly with regard to the synchronization, inasmuch as the sensor fields are not arranged in a common plane. Furthermore, the maximum velocity with forward displacement is severely limited, meaning that only the observation of comparatively slow flows is possible. Although no partcularly high flow rates occur in three-dimensional flows in fluids, totally different relationships result from, for example, flows in wind tunnels.

An apparatus for determining two-dimensional flows using a light source for briefly illuminating a light section and having a recording device which has an objective aligned perpendicular to the plane of the light section and an optical sensor field aligned parallel to the plane behind the objective, whereby a forward displacement device having a revolving mirror is provided for the image of the light section on the sensor field, is known from the article "Measuring Turbulence in Reversing Flows by Particle Image Velocimeter" (Gran, I. et al., ICALEO 92/L.I.A. vol. 68, 1989). The revolving mirror is arranged in the path of the beam between the light section and the sensor field. With the double exposure of the light section the revolving mirror rotates so that a beam of light emanating from the same point of the light section is projected onto two different places on the sensor field. This corresponds to a displacement of the image of the light section on the sensor field. However, according to the article mentioned above, a forward displacement device with a revolving mirror can only be employed for flow rates up to 30 m/s. In wind tunnels values of more than 100 m/s are reached. Moreover, the known apparatus, as was already mentioned, is only suitable for the determination of two-dimensional flows.

The restriction on a forward displacement device with a revolving mirror to applications in which the flow rates do not exceed 30 m/s, results from the article (Image Shifting Technique to Resolve Directional Ambiguity in Double-pulsed Velocimetry" (Adrian, R. J., Applied Optics, Vol. 25, No. 21, 1 Nov. 1986). This article is concerned with an apparatus for the determination of two-dimensional flows which, in terms of all the essential points, correspond to those already described.

SUMMARY OF THE INVENTION

It is the object of the invention to further develop an apparatus of the aforementioned type in such a way that it can also be used for the three-dimensional determination of flows with higher velocities, for example, in a wind tunnel.

According to the invention, this is achieved in that the forward displacement or image shifting device has two revolving mirrors aligned parallel, rotating in synchronization about a common axis of rotation and synchronized with the light source, whereby the axis of rotation runs parallel to an imaginary line joining the two objectives. Surprisingly, by using two revolving mirrors rotating in synchronization about a common axis of rotation it is possible to bring about such a precisely synchronized forward displacement that flow rates well over 500 m/s can also be evaluated. This is really astounding because the stereoscopic arrangement should already amplify the error in each individual measurement on the separate sensor fields. The geometrical arrangement of the revolving mirrors and their common axis of rotation eases the evaluation of the double-exposure images of the light section or light sheet on the sensor fields. In doing this it is obvious that the axis of rotation should always be set up perpendicular to the maximum flow rate occuring in the light section so that the desired mathematical sign is actually achieved through the forward displacement.

The synchronization of the two revolving mirrors with each other can be particularly easily and accurately achieved through the use of a common drive shaft. For technical reasons concerning bearings and vibrations, the drive shaft can also be divided into several smaller shafts linked together by torsion-resistant shaft couplings.

There can be an encoder on this common drive shaft for synchronizing the revolving mirrors with the light source, whereby the encoder emits one start signal and one position signal per revolution of the shaft with a multiplicity n of equally spaced intermediate signals, and whereby one intermediate signal coincides with the time of the start signal. Therefore, the encoder permits the registration of the current angular position of the revolving mirrors. For this, only the angular position of the revolving mirrors corresponding to the start signal needs to be known.

Also particularly advantageous is the adjustability of the position of the encoder, corresponding to the start signal, relative to the angular position of the revolving mirrors in order to allocate the start signal of the encoder to a certain, desired angular position of the revolving mirrors. For this, the encoder housing can be simply turned relative to the rest of the recording device about the axis of rotation of the revolving mirrors. Alternatively however, the adjustability can be realized through an adjustable delay for the start signal.

For synchronizing the revolving mirrors with the light source, a digital control can be provided in conjunction with the encoder, whereby the control forms a difference signal from the position signal and the start signal of the encoder, superimposes a feedback signal from the light source on the difference signal to make a control signal, adds up the control signal in a counter and, upon reaching a count n, sends a trigger (drive) signal to the light source and resets the counter, and whereby the light source, upon receiving the trigger signal, emits two flashes of light, one after the other, for illuminating the light section as well as sending out the feedback signal simultaneously with one of the flashes of light. This control ensures, independently of the start conditions, that one of the flashes of light coincides with the time of the encoder start signal. Therefore, adjustment of the apparatus is possible without having to take into account the response time of the light source. The response time of the light source would need to be more accurately considered if, for example, the light source without feedback was to be triggered depending exclusively on the angular position of the revolving mirror. According to experience, if this was the case, additional fluctuations occuring in the response time of the light source would need to be compensated. However, these problems are all overcome here. The control shifts the light source trigger signal until it coincides exactly with the encoder start signal, or expressed more accurately, takes its place. For this, the intermediate signal for the encoder position signal corresponding to the start signal is first removed from the intermediate signal so that the intermediate signal is now only composed of n−1 intermediate signals per revolution of the drive shaft. Following this, the reduced position signal, the so-called difference signal, has a feedback signal from the light source superimposed on it, whereby the feedback signal specifies the exact point in time at which the light source emits a flash of light. The original number of n intermediate signals then results again through the superimposing, if the light source feedback signal takes the exact position of the encoder start signal. In any other case, a counter adding up the control signal only reaches the count n after more than one revolution of the drive shaft for the revolving mirrors. Therefore, as the counter at the same time triggers the light source, the flash of light triggering the feedback signal with respect to the encoder start signal is displaced until these actually coincide, which results in the revolving mirrors being perfectly synchronized with the light source. The digital control described here is not only suitable for use in forward displacement devices for stereoscopic recording devices but can also be advantageously employed in any forward displacement device with one or more revolving mirrors.

Advantageously, the light source has two separate lasers which emit, one after the other, two flashes of light with adjustable temporal separation for illuminating the light section. Therefore, light sources with two separate lasers are to be preferred because they exhibit better uniformity when illuminating the light section than, for example, a single laser emitting two flashes of light in very close succession, where basically an alteration in output between the two flashes of light can be seen. Furthermore, lasers are in principle advantageous with respect to heterochromatic light sources inasmuch as the stereoscopic arrangement of the recording device leads to a not inconsiderable wavelength-dependent distortion of the light section images on the sensor fields. However, with monochromatic illumination of the light section, this distortion is easily taken into account through simple geometric arrangements, for example, by means of a reference grid.

A d.c. motor or a 3-phase a.c. motor can be provided for driving the two revolving mirrors. These types of motors are characterized by an advantageously large range of control. Furthermore, the 3-phase a.c. motor has another positive rotationary control which furthers precision. However, costly controls are necessary for both d.c. motors and, in particular, 3-phase a.c. motors.

A stepping motor, provided for driving the two revolving mirrors, presents less demands on the control. This can be easily triggered digitally. On the other hand, multistage stepping motors also exhibit poor smoothness of running. However, this can be improved to an excellent level by the allocation of a flywheel. Together with the flywheel, less closely stepped stepping motors can also be used, which are suitable for higher rotational speeds and, hence, greater forward displacements of the light section images on the sensor fields.

A further improvement to the smoothness of running when using a stepping motor can be achieved by providing a toothed belt between the stepping motor and the revolving mirrors. The elasticity of the toothed belt thus absorbs the irregular running of the stepping motor. It is obvious that in this case the flywheel should not be located directly at the stepping motor but, on the contrary, behind the toothed belt at the drive shaft for the revolving mirrors.

A particularly compact form of construction for the apparatus ensues if the revolving mirrors are arranged to receive light from the objectives and to pass light to the sensor fields, whereby the sensor fields are to be aligned geometrically parallel to the optical axes of the objectives.

For increasing the temporal resolution of the flow, several sensor fields can be arranged behind each of the revolving mirrors, whereby said each sensor field is illuminated by two flashes of light following each other in quick succession.

Besides, additional sensor fields located to receive light from the revolving mirrors, for example, in the form of video chips, can also serve the simplified adjustment of the recording device with regard to image sharpness, signal-to-noise ratio and separation of the two images of the same particle, without the need for a sensitive, fine-grained and expensive special film which is employed for the actual measurement but cannot be directly evaluated.

In the following, the invention will be explained in more detail and described by means of an embodiment example.

BRIEF DESCRIPTION OF THE DRAWINGS

FIG. 3 shows a block diagram of a control for the apparatus according to FIG. 1, and FIG. 4 shows various digital signals occuring in the control according to FIG. 3.

DETAILED DESCRIPTION

Figure 1:
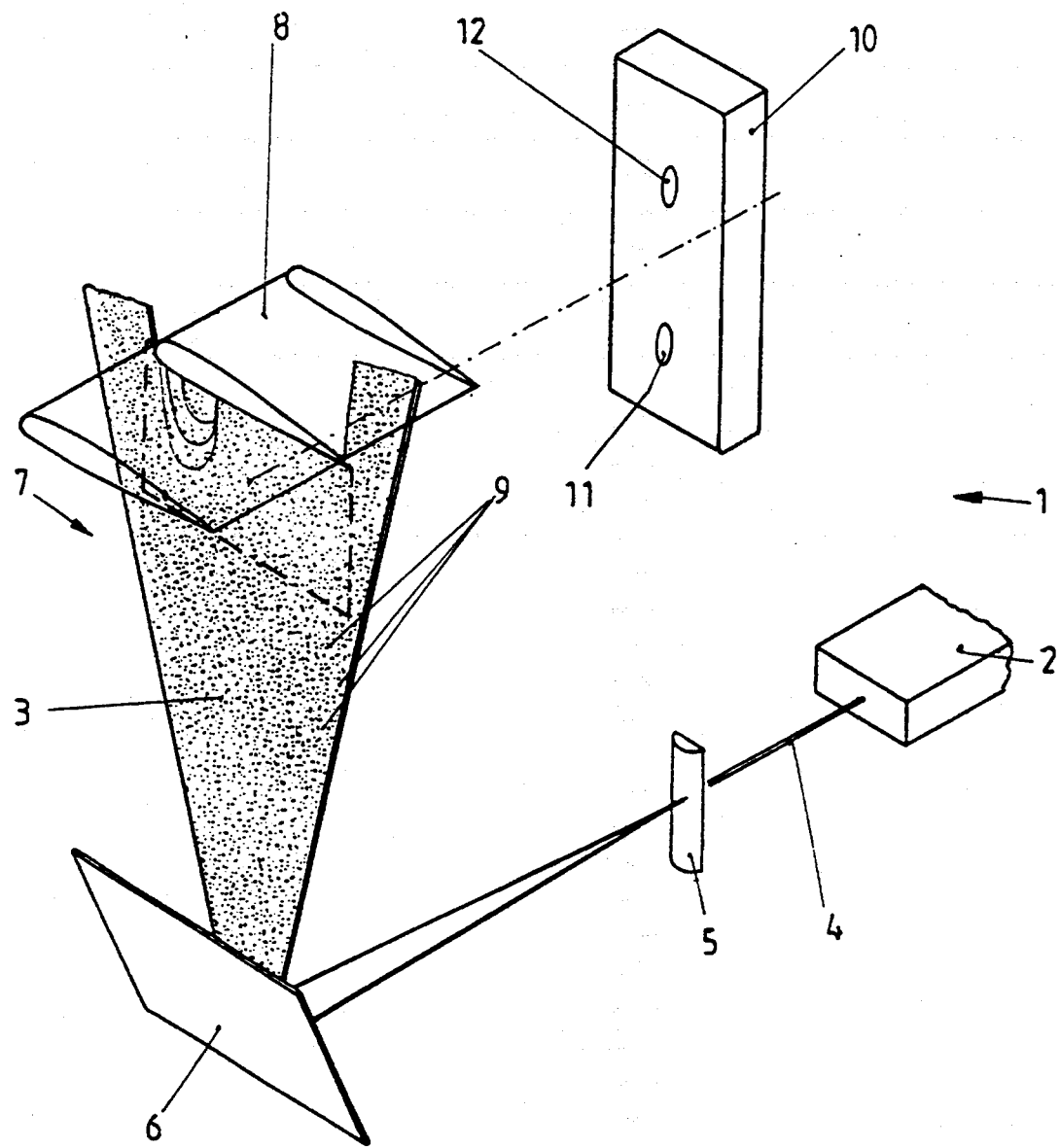
FIG. 1 shows a perspective overall view of the apparatus.

The apparatus 1 shown in FIG. 1 has a light source 2 for briefly illuminating or forming a light section or light sheet 3. The light source 2 emits a laser beam 4 which is widened in one direction by a cylindrical lens 5 and is turned by a mirror 6 into the area of a flow 7 which is to be investigated. The area of the flow to be investigated here is located below a wing profile 8. The flow is doped with light-scattering particles 9 which allow the light section 3 to become visible. A stereoscopic recording device 10 with two objectives 11 and 12 is provided for observing and recording the light section 3. The objectives 11 and 12 have optical axes aligned perpendicular to the plane of the light section 3 and parallel to each other. The recording device 10 serves for recording of double exposure images of the light section 3, whereby the light source 2 emits two flashes of light one after the other in quick succession. The temporal separation between the two flashes of light must be selected depending on the position of the light section so that as many particles as possible remain in the light section between the two flashes of light and, therefore, are to be found on each of the two images of the light section. Then the path traced by any single particle in the temporal separation between the flashes of light can be established according to length and direction from the separation between the two images of said particle, thereby also giving the velocity of the particle. However, the mathematical sign for the direction and the velocity too can only be obtained without further ado from the double exposure images of the light section if a forward displacement or image shift of the images is performed with the second exposure which is greater than the maximum path traced opposite to the direction of forward displacement between the two flashes of light.

Figure 2A:
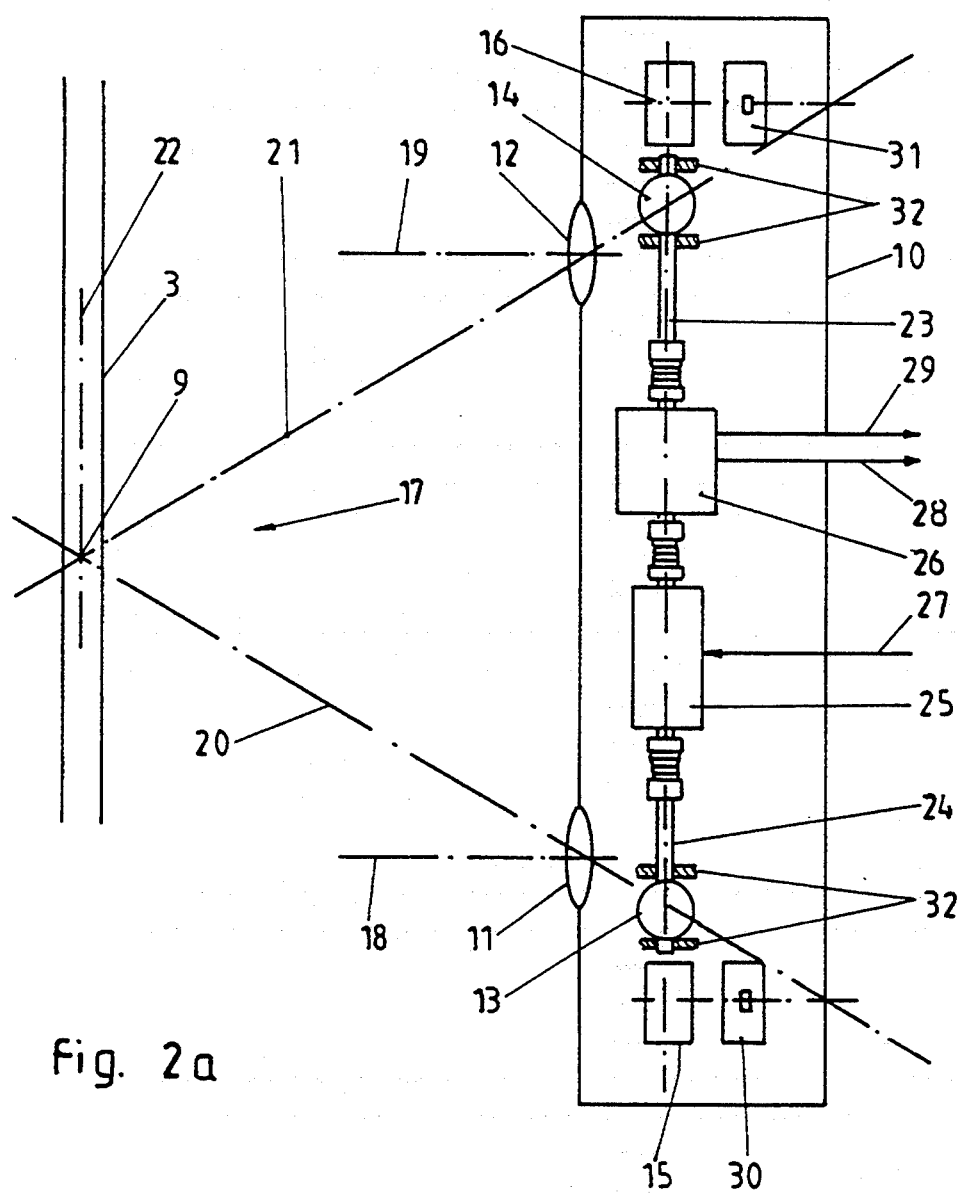
FIG. 2A is a cross-sectional, side view of the recording device for the apparatus of FIG. 1.
Figure 2B:
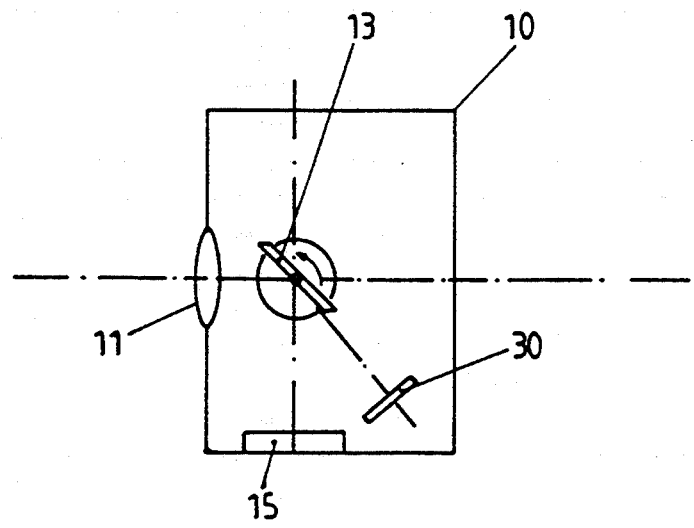
FIG. 2B is a cross-sectional, top view of the recording device for the apparatus of FIG. 1.

The corresponding construction of the recording device 10 can be seen in FIGS. 2a and 2b. Here, FIG. 2a shows a longitudinal section through the recording device 10 and FIG. 2b a cross-section through the recording device 10 at the level of the objective 11 looking downwards. In the recording device 10, behind objectives 11 and 12, are two revolving mirrors 13 and 14 arranged parallel to each other as well as two optical sensor fields 15 and 16 also arranged parallel to each other. The positions of the revolving mirrors 13 and 14 as well as the optical sensor fields 15 and 16 correspond to each other here in relation to an area 17 of the light section 3 which is located between the optical axes 18 and 19 of objectives 11 and 12. Therefore, a particle located in the area 17 is mapped onto the sensor fields 15 and 16 by the two objectives 11 and 12 from different directions 20 and 21. The stereoscopic effect of the recording device 10 is based on this. Considered optically, the sensor fields 15 and 16 are arranged parallel to the plane 22 of the light section 3. However, the intermediate arrangement of the revolving mirrors 13 and 14 leads to a geometrical arrangement in which the sensor fields 15 and 16 run parallel to the optical axes 18 and 19. The revolving mirrors 13 and 14 have a common axis of rotation 23. The axis of rotation 23 is arranged parallel to an imaginary line joining the two objectives 11 and 12. Furthermore, the two revolving mirrors 13 and 14 have a common drive shaft 24. A motor 25 and an encoder 26 are located on the drive shaft 24. The motor 25 is a stepping motor, the rotational speed of which is regulated by a control, not illustrated here, by means of a digital control signal 27. A flywheel can be allocated to the motor 25, designed as a stepping motor, to improve the smoothness of running of the drive shaft 24. Per revolution the encoder 26 emits one start signal 28 and one position signal 29 with a multiplicity n of equally spaced intermediate signals. The start signal 28 is correlated with a certain position of the revolving mirrors 13 and 14. This position, which is indicated outwards by the start signal, can be freely adjusted. Therefore, the start signal can indicate, on the one hand, that the image of the area 17 falls on the sensor fields 15 and 16, while on the other hand, it can specify that the parallel revolving mirrors 13 and 14 direct the image onto video chips 30 and 31. Video chips 30 and 31 serve for adjusting and setting the recording device 10 before the actual twin-flash exposure is recorded, for example, using special film material as sensor fields 15 and 16. When adjusting and setting the recording device 10 with the aid of video chips 30, 31, care should be taken to ensure adequate sharpness of the light section images, a good signal-to-noise ratio and ample distance between the individual images of the same respective particles. Moreover, the forward displacement can also be set in such a way that it compensates, at least to a large extent, a primary displacement of the particles in the flow in order to allow the measuring effect superimposed on the primary displacement to become more highly evident. For this, a forward displacement by a negative value, in other words a backward displacement of the respective second image of the light section opposite to the principal direction of the flow, is normally carried out.

The revolving mirrors 13 and 14 synchronized via the common drive shaft 24 in the embodiment form of the recording device 10 permit such a rapid forward displacement of the image of the area 17 on the sensor fields 15 and 16 that flows with very high flow rates, well above 500 m/s, can also be evaluated. Furthermore, the recording device 10 can be extended by further sensor fields to improve the temporal resolution of the flow. The measuring errors introduced by the revolving mirrors 13 and 14 can be kept within close tolerances by employing a precision bearing 32 and, in particular, by synchronizing the revolving mirrors 13 and 14 precisely with the light source 2 according to FIG. 1 by using the encoder 26.

The digital control 33 which comes into use here is reproduced schematically in FIG. 3. A first logical circuit 34 forms a difference signal 35 from the start signal 28 and the position signal 29 of the encoder 26. A second logical circuit 36 forms a control signal 38 from the difference signal 35 and a feedback signal 37 coming from the light source 2. Here, the difference signal 35 and the feedback signal 37 are superimposed. The control signal 38 is added up in a counter 39. Upon reaching a count n, the counter 39 sends out a trigger signal 40 to the light source 2. At the same time the counter is reset to zero. If the feedback signal 37 coincides exactly with a flash of light emitted by the light source 2, this brings about an exact synchronization between the start signal 28 of encoder 26 and this flash of light.

This can be seen in more detail in FIG. 4. Here, the individual signals 28, 29, 35, 37, 38 and 40, which are processed or generated respectively by the control 33, are illustrated for one example. FIG. 4a shows the position signal 29 of encoder 26 which is made up of equally spaced intermediate signals 41. Correspondingly, FIG. 4b reproduces the start signal 28 of encoder 26 which is correlated with a certain position of the revolving mirrors 13 and 14 according to FIGS. 2a and 2b. The difference signal 35 shown in FIG. 4c is distinguished from the position signal 29 in that it exhibits no intermediate signal 41 at the position of the start signal 28. Accordingly, the difference signal 35 exhibits not n but n−1 intermediate signals per revolution of the drive shaft 24 according to FIGS. 2a and 2b. The feedback signal 37 exhibits, as shown in FIG. 4d, no correlation with the start signal 28 at first. However, in this case a control signal 38 ensues from the superimposing of the difference signal 35 and the feedback signal 37 which, like the difference signal 35, only comprises n−1 intermediate signals per revolution of the drive shaft. Accordingly, the counter 39 only releases the trigger signal 40 according to FIG. 3 after more than one revolution of the drive shaft 24. This results in a backward displacement of the flash of light emitted from the light source 2 and, hence, the feedback signal 37 too. The size of the displacement corresponds to the nth part of one revolution of the drive shaft 24. The result of the displacement is illustrated in FIGS. 4f and g. Here, the feedback signal 38 displaced backwards already falls exactly in the gap of the difference signal 35 which is isochronous with the start signal 28. Therefore, a stable condition is achieved. The counter 39 always reaches the count n after exactly one revolution of the drive shaft 24 and a further backward displacement of the flash of light or the feedback signal 37 respectively emitted from the light source 2 does not take place. It is obvious that to reach the stable condition, up to n−1 revolutions of the drive shaft 24 will be necessary in an extreme case.

Legend for drawings

1 = Apparatus
2 = Light source
3 = Light section
4 = Laser beam
5 = Cylindrical lens
6 = Mirror
7 = Flow
8 = Wing profile/section
9 = Particles
10 = Recording device
11 = Objective
12 = Objective
13 = Revolving mirror
14 = Revolving mirror
15 = Sensor field
16 = Sensor field
17 = Area
18 = Optical axis
19 = Optical axis
20 = Direction
21 = Direction
22 = Plane
23 = Axis of rotation
24 = Drive shaft
25 = Motor
26 = Encoder
27 = Control signal
28 = Start signal
29 = Position signal
30 = Video chip
31 = Video chip
32 = Bearing
33 = Control
34 = Circuit
35 = Difference signal
36 = Circuit
37 = Feedback signal
38 = Control signal
39 = Counter
40 = Trigger/drive signal
41 = Intermediate signal

We claim:

1. An apparatus for the three-dimensional determination of flows, said apparatus comprising:

a light source (2) for intermittently forming a sheet (3) of light, a stereoscopic recording device (10) which has two objectives (11, 12) with optical axes (18, 19) aligned parallel to each other as well as perpendicular to a plane (22) of the sheet (3) of light, two optical sensor fields (15, 16) arranged to receive light from the objectives (11, 12), and aligned perpendicular to the plane (22), an image shifting device for shifting the projections of the light source (2) onto the two sensor fields (15, 16), said image shifting device including a drive shaft (24), two mirrors (13, 14) mounted parallel to each other on said drive shaft (24), motor means (25) for rotating said drive shaft (24) and mirrors (13, 14) about a common axis of rotation (23), the axis of rotation (23) of said mirrors (13, 14) extending parallel to an imaginary line joining said two objectives (11, 12), an encoder (26) associated with said drive shaft (24), for emitting a start signal (28) and a position signal (29) per revolution of said drive shaft (24) as said drive shaft (24) rotates, said position signal being composed of a multiplicity n of equally spaced intermediate signals (41) per revolution of the drive shaft, with one of the intermediate signals (41) coinciding with the time of the start signal (28), a digital control (33) for synchronizing the rotation of the revolving mirrors (13, 14) with the intermittent forming of the sheet (3) of light from the light source (2), said digital control (33) including means for forming a difference signal (35) from said position signal (29) and said start signal (28) of the encoder (26), superimposing a feedback signal (37) from the light source (2) on the difference signal to make a control signal (38), adding up pulses in the control signal (38) in a counter (39) and, upon reaching a count n, sending a trigger signal (40) to the light source (2) and resetting the counter (39), and said light source (2) including means for emitting two flashes of light, one after the other, in response to receiving the trigger signal (40) to intermittently form the sheet (3) of light as well as simultaneously emitting the feedback signal (37) with one of the flashes of light.

2. An apparatus according to claim 1, wherein the position of the encoder (26) can be adjusted in relation to the revolving mirrors (13, 14).

3. An apparatus according to claim 1, wherein the light source (2) has two separate lasers which emit two flashes of light, one after the other, for creating two sheets of light (3) with an adjustable temporal separation.

4. An apparatus according to claim 1, further comprising a d.c. motor or a 3-phase a.c. motor (25) coupled to drive the two revolving mirrors (13, 14).

5. An apparatus according to claim 1, further comprising a stepping motor (25) provided for driving the two revolving mirrors (13, 14) and said stepping motor including a flywheel for improving its smoothness of running.

6. An apparatus according to claim 5, further comprising a toothed belt provided between the stepping motor and the revolving mirrors (13, 14).

7. An apparatus according to claim 1, wherein the revolving mirrors (13, 14) are located to receive light from the objectives (11, 12) and to pass light to the sensor fields (15, 16), the sensor fields (15, 16) being aligned geometrically parallel to the optical axes of the objectives (11, 12).

8. An apparatus according to claim 1, further comprising a plurality of sensor fields (15, 16) located to receive light from each of the revolving mirrors (13, 14).

9. An apparatus according to claim 8, wherein one of the sensor fields located to receive light from each of the revolving mirrors (13, 14) is a video chip (30, 31).

* * * * *